US011885567B2

(12) United States Patent
Cousins et al.

(10) Patent No.: US 11,885,567 B2
(45) Date of Patent: Jan. 30, 2024

(54) METHOD OF RECORDING IMAGES WITHIN A FURNACE USING A THERMAL IMAGING CAMERA COMPRISING A BORESCOPE

(71) Applicant: JOHNSON MATTHEY PUBLIC LIMITED COMPANY, London (GB)

(72) Inventors: Matthew John Cousins, Billingham (GB); Michael Davies, Billingham (GB); Andrew Johnson, Billingham (GB); Peter Stones, Billingham (GB); Paul White, Billingham (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 187 days.

(21) Appl. No.: 17/594,476

(22) PCT Filed: May 18, 2020

(86) PCT No.: PCT/GB2020/051206
§ 371 (c)(1),
(2) Date: Oct. 18, 2021

(87) PCT Pub. No.: WO2020/249925
PCT Pub. Date: Dec. 17, 2020

(65) Prior Publication Data
US 2022/0221225 A1    Jul. 14, 2022

(30) Foreign Application Priority Data

Jun. 10, 2019  (GB) ..................... 1908217

(51) Int. Cl.
*H04N 5/33* (2023.01)
*F27D 21/02* (2006.01)
(Continued)

(52) U.S. Cl.
CPC ............... *F27D 21/02* (2013.01); *C01B 3/38* (2013.01); *G01J 5/0044* (2013.01);
(Continued)

(58) Field of Classification Search
CPC ............. F27D 21/02; F27D 2021/023; F27D 2021/026; H04N 23/51; H04N 23/695;
(Continued)

(56) References Cited

U.S. PATENT DOCUMENTS 3,473,384 A    10/1969    Baron
5,000,533 A     3/1991    Gerwers
(Continued)

FOREIGN PATENT DOCUMENTS

| EP | 2023180 A1 | 2/2009 |
|---|---|---|
| JP | S61155928 A | 7/1986 |
| WO | 8604475 A1 | 7/1986 |

*Primary Examiner* — Patrick E Demosky
(74) *Attorney, Agent, or Firm* — BakerHostetler

(57) ABSTRACT

A method of recording images within a furnace using a thermal imaging camera comprising a bore scope connected to a digital camera unit is described, comprising the steps of: (a) inserting the borescope into the interior of the furnace, (b) collecting one of more images of the interior of the furnace using the thermal imaging camera with the borescope at a first position, and (c) moving the borescope from the first position to a second position and collecting one or more images of the interior of the furnace as the borescope is moved from the first position to the second position, wherein the borescope movement is guided by means of a guide device comprising a movable borescope mounting, mounted externally on the furnace.

20 Claims, 5 Drawing Sheets

(51) Int. Cl.
    *C01B 3/38*      (2006.01)
    *G01J 5/00*      (2022.01)
    *G02B 23/24*      (2006.01)
    *H04N 5/265*      (2006.01)
    *H04N 23/51*      (2023.01)
    *H04N 23/52*      (2023.01)
    *H04N 23/695*      (2023.01)
    *H04N 23/50*      (2023.01)

(52) U.S. Cl.
    CPC ......... *G02B 23/2484* (2013.01); *H04N 5/265* (2013.01); *H04N 23/51* (2023.01); *H04N 23/52* (2023.01); *H04N 23/695* (2023.01); *C01B 2203/0233* (2013.01); *C01B 2203/1005* (2013.01); *F27D 2021/023* (2013.01); *F27D 2021/026* (2013.01); *G01J 2005/0077* (2013.01); *H04N 23/555* (2023.01)

(58) Field of Classification Search
    CPC ...... H04N 23/52; H04N 5/265; H04N 23/555; C01B 3/38; C01B 2203/0233; C01B 2203/1005; G01J 5/0044; G01J 2005/0077; G02B 23/2484
    See application file for complete search history.

(56) References Cited

U.S. PATENT DOCUMENTS

| | | | |
|---|---|---|---|
| 8,219,247 B2 | 7/2012 | Esmaili et al. | |
| 8,300,880 B2 | 10/2012 | Esmaili et al. | |
| 2012/0261568 A1 | 10/2012 | Coon et al. | |
| 2013/0335530 A1* | 12/2013 | Hatcher, Jr. | G02B 23/2484 348/46 |
| 2016/0025653 A1* | 1/2016 | Jalilian | A61B 1/00042 356/241.1 |
| 2017/0171418 A1* | 6/2017 | Zhao | H04N 1/00989 |
| 2018/0231875 A1 | 8/2018 | Zanganeh et al. | |
| 2019/0328217 A1* | 10/2019 | Moreau | A61B 1/00174 |

* cited by examiner

METHOD OF RECORDING IMAGES WITHIN A FURNACE USING A THERMAL IMAGING CAMERA COMPRISING A BORESCOPE

The present invention relates to a method for recording thermal images of the interior of a furnace and apparatus therefor.

Steam methane reformers are examples of furnaces in which the furnace contains a plurality of externally-heated, catalyst-filled tubes. A reaction mixture containing methane and steam is passed through the tubes over a steam reforming catalyst disposed within the tubes to generate a gas mixture containing hydrogen, carbon monoxide and carbon dioxide, often termed synthesis gas. The external heating is typically provided by a combustion gas produced by combustion of a fuel using a plurality of burners arranged on the internal walls of the furnace.

Efficient operation of furnaces, including steam methane reformers, is of growing importance and mal-operation, for example resulting in hot spots, can lead to damage to the furnace, the tubes and the catalyst. Therefore, there is a need for operators to better understand the conditions within the furnace and in particular the temperatures of surfaces, including the tube wall temperatures, and how these might be controlled to improve efficiency in the utilization of the fuel and prevent damage to the furnace, the tubes and the catalyst.

U.S. Pat. No. 8,300,880 discloses a method for determining temperature information on a plurality of tubes in a furnace by capturing a plurality of digital images of the interior of the furnace and processing the images to obtain temperature information for the plurality of tubes.

U.S. Pat. No. 8,219,247 discloses a method of operating a furnace having process tubes and multiple burners where it is desired to conform the temperatures of the process tubes to selected target temperature criterion. The method uses a plurality of images comprising pixel data associated with the tubes to obtain temperature information that is used to adjust burner flow rates to result in desired tube wall temperatures, for example to minimize the temperature deviation between tube wall temperatures at a predetermined elevation in the furnace.

US20170171418 discloses a method for thermal imaging of an interior space of a high temperature furnace through an opening in a wall of the furnace. An outer housing houses at least a portion of an air-cooled rigid borescope. A camera is operatively connected to the cooled borescope but is located such that it is isolated from the air passing through the outer housing.

These methods use portable thermal imaging cameras to collect the digital images. Portable thermal imaging cameras are manually operated and are used to collect images by typically directing a borescope connected to a digital camera unit through an inspection-hole in the furnace wall. The thermal imaging camera captures time-varying temperature data within a furnace in the form of a thermal 'video', i.e. as a sequence of images, each containing temperature data at an instant in time. For furnace temperature monitoring the use of a portable thermal imager offers significant advantages over a point pyrometer, allowing large amounts of data to be captured very rapidly.

However, a number of challenges remain. The field of view of the thermal imaging camera is typically much smaller than the total field of view through an inspection port, so its position and orientation within the peephole must be varied to maximise data capture. This movement of the imager compromises the quality of the data by introducing motion blur and parallax effects, complicating analysis. A problem with using portable thermal imaging cameras therefore is that the ability of computer software used to process the images to determine the temperatures within the furnace is reduced by variability introduced by the manual collection method. There is therefore a need to reduce the variability in image collection using portable thermal imaging cameras. Moreover, using portable thermal imaging cameras to capture images with the most useful field of view requires skilled, specially-trained operators and there is a need to allow broader use of such equipment in a more reproducible way.

Accordingly the invention provides a method of recording images within a furnace using a thermal imaging camera comprising a borescope connected to a digital camera unit, comprising the steps of: (a) inserting the borescope into the interior of the furnace, (b) collecting one of more images of the interior of the furnace using the thermal imaging camera with the borescope at a first position, and (c) moving the borescope from the first position to a second position and collecting one or more images of the interior of the furnace as the borescope is moved from the first position to the second position, wherein the borescope movement is guided by means of a guide device comprising a movable borescope mounting, mounted externally on the furnace.

The invention further provides an apparatus for recording images within a furnace, comprising (i) a thermal imaging camera comprising a digital camera unit connected to a borescope and capable of recording a plurality of images, and (ii) a guide device comprising a movable borescope mounting for guiding the borescope, wherein the guide device is configured to be mounted externally on the furnace and to guide the movement of the borescope from a first position to a second position within the furnace.

The invention further provides a furnace comprising the apparatus, said furnace having one or more inspection holes or other orifices through which the borescope is inserted.

The invention further provides a guide device suitable for guiding a borescope of a thermal imaging camera within a furnace, said guide device comprising a borescope guide device comprising a movable borescope mounting and configured to be mounted on the exterior of the furnace.

By "mounted" we include the options of the guide device fixed permanently in place on the exterior of the furnace or fixed temporarily and moved from location to location when desired.

The present invention includes inserting the borescope of a thermal imaging camera through an opening in a wall of a furnace and then collecting one or more images of the interior of the furnace. The thermal imaging camera comprises a digital camera unit connected to the borescope. The borescope is typically an elongate tube or housing having a viewing end and a sensor end aligned along the same longitudinal axis. The thermal imaging camera desirably comprises a digital camera comprising an optical sensor; a rigid borescope comprising an elongated housing having a viewing end and a sensor end, and a multi-element relay lens assembly within the elongated housing having at least two optical pieces for directing a real image viewed by the rigid borescope to the digital camera. The viewing end of the borescope suitably comprises a lens and the sensor end of the borescope is operatively connected to the camera. The digital camera may be rigidly-attached to the sensor end of the borescope. The thermal imaging camera may further comprise a battery or power-source connection, a controller, and a display. Such thermal imaging cameras are commercially available, e.g. from AMTEK® Land Instruments.

In order to protect the lenses in the borescope from damage and to improve image quality, it may be desirable to cool the borescope, for example by means of a cooling fluid cool gas passing through a housing that encloses at least part of the borescope. Thus, in a preferred arrangement, the thermal imaging camera comprises an outer housing containing at least a portion of the rigid borescope extending from the viewing end of the borescope and extending towards the sensor end, the outer housing having an outlet at the viewing end and an inlet adjacent the sensor end to permit a cooling fluid, such as air, to be passed through the housing. A partition member may be present within the outer housing to prevent the cooling fluid entering the camera. Such a thermal imaging camera is described in the aforesaid US2017/0171418, which is herein incorporated by reference.

The one or more images are collected at the first position, which may be any suitable position for the collection of the one or more images, such as a position at which the borescope is directed towards a surface within the furnace. The surface within the furnace may be any surface about which temperature information is wanted. The method is of particular use in establishing the temperature profiles of tubes within the furnace, especially catalyst-filled tubes within the furnace.

The furnace may be a steam reformer comprising a plurality of tubes containing a steam reforming catalyst. The furnace typically has one or more inspection holes or other suitable orifices or openings through which the borescope may be inserted.

The present invention requires that the borescope is guided, by means of a guide device comprising a movable borescope mounting, from the first position to the second position, and that a plurality of images is collected as the borescope is moved from the first position to the second position. The guide device controls the movement of the borescope within the furnace in a pre-determined manner. The second position may be any suitable position for the collection of images and includes a position adjacent to or overlapping with, the first position. Thus, the borescope may be moved from the first position to a distinct second position or may be moved in a single stage or in a combination of stages in a circuitous or serpentine path from the first position to the second position, which may be adjacent to, or overlap with, the first position.

By collecting the plurality of images in a controlled manner, errors in the generation of thermal data are reduced and a more complete image of the interior of the furnace is realised. Furthermore, computer software is more readily is able to combine the images for determining overall temperatures of the surfaces in the furnace. Thus, the method may further comprise a step of (d) combining the images collected in steps (b) and (c) to create a composite image of the interior of the furnace. The composite image may be used for the identification of surfaces of interest within the furnace. The combining of the images may be performed by processing the images using commercial computer software suitable for image manipulation. Using the collected images, it is possible to extract temperature data on the surfaces of interest either directly from the composite image or by reference back to the corresponding points in the original images.

By using the guide device comprising a movable borescope mounting, the quality of the information from the thermal imaging camera is improved. The movement from the first position to the second position may be manual or driven by a motor. However, for periodic measurement using portable equipment, manual movement of the camera and borescope are preferred as this reduces complexity and cost. By using the guide device, the thermal imaging measurement is more reproducible because the guide device may be mounted in the same manner at each orifice through which the borescope is inserted and the movement of the borescope simply repeated for each collection of images. Therefore, the processing of each of the combinations of collected images to produce an overall composite image of the interior of the furnace may be considerably simplified and improved.

The guide device comprises a movable mounting. The movable mounting enables the borescope to be moved in the desired manner. The moveable mounting preferably constrains the movement of the borescope to a single degree of freedom such that the tip of the borescope moves from the first position to the second position along a continuous path. This path may include straight line segments, circular or elliptical arcs, segments of arbitrary continuous curves, or a combination of these.

The movable mounting may be located within a frame configured to be mounted on the exterior of the furnace. The movable mounting may be located within the frame by any manner that enables the desired controlled movement, such by means of hinges, a ball-and-socket joint, or within a track. If within a track, the movable mounting may be mounted on bearings or a plurality of wheels.

Preferably, the movable mounting is configured to be rotated. Where located in a frame, this may be achieved by providing the movable mounting with wheels or bearings that engage with a circular track disposed within the frame.

The borescope may be attached to the guide device or may be inserted through an opening in the guide device that accommodates the housing of the borescope. The borescope may, if desired, be secured to the guide device by a clamp or locking pins on the outside of the housing that hold it in place. The guide device may be mounted on the external wall of the furnace and then the borescope inserted through the movable mounting and into the furnace. Alternatively, the borescope may be inserted through the movable mounting and the combination of guide device, borescope and thermal imaging camera moved from location to location around the furnace.

The borescope typically will provide a conical field of view around an optical axis aligned with, and extending from, the end of the borescope. In one embodiment, the end of the borescope is moved in a curve. The curve described by the end of the borescope as it moves from the first position to the second position may be chosen such that the composite field of view captured during the movement is maximised. In a preferred embodiment, the movable mounting holds the borescope at an angle of between 20 and 90 degrees, preferably at an angle of between 25 and 75 degrees, to a surface of the furnace on which the guide device is mounted. This allows the borescope to capture images of surfaces in the furnace that may not readily be observed otherwise. In a particularly preferred embodiment, the movable mounting holds the borescope at an angle of between 25 and 75 degrees to the furnace and provides a circular movement from the first position to the second position, thereby causing the borescope to describe a cone within the furnace as the borescope is moved from the first position to the second position.

The guide device may comprise a frame in the form of a shaped metal or ceramic plate supporting the movable mounting. The frame may have lobes or horns supporting spacing members or pins extending from the back of the frame that act to space the frame from the wall of the furnace on which it is to be mounted.

The frame may further comprise one or more clamps, such as a screw clamp, for clamping the guide device to a wall of a furnace. Alternatively, or additionally, one or more magnets may be placed on the furnace-facing side of the frame to assist in securing its position on the exterior of the furnace. The frame may also be attached to the furnace by means of spring clips or other suitable attachment means. Brackets on the exterior of the furnace may also be used to support or attach the frame or guide device. Adjustable spacing means may be provided to hold the frame rigidly on uneven furnace walls. The frame may also comprise a supporting member that extends from the bottom of the frame in use towards the furnace to rest on the bottom edge of the opening through which the borescope is inserted. Alternatively, or additionally, the guide device may be supported on a stand comprising one, two or more legs connected to the frame, which desirably are adjustable to support the weight of the guide device and thermal imaging camera apparatus. This improves the stability and rigidity of the apparatus during the collection of the images. The use of a stand allows the guide device to be mounted externally to the furnace without affixing it to the exterior wall of the furnace where this is not possible.

The frame may further comprise a scale indicating the distance the movable borescope mounting has moved during the collection of images. The movable borescope mounting may then comprise means to indicate the position of the movable mounting relative to the scale.

A circular track may be fixed within the frame that provides a circular space in which the movable mounting may be located. Other shapes of track may be used. The movable mounting may then move on the track within the frame. Where a circular track is present, the movable mounting may be a lobed structure, e.g. a 3-, 4- or 5-lobed structure comprising freely rotating wheels mounted in each of the lobes that run on the track and enable the movable mounting to rotate within the frame. The movable mounting may also comprise a circular plate mounted on bearings within a circular track or may be any other design in which the movable mounting may be rotated. A smooth circular movement is most preferred to maximise the quality of the collected images and simplify the processing of the collected images.

The movable mounting desirably further comprises a borescope mounting, which may be tubular, that passes through the movable mounting. The borescope mounting may be positioned anywhere suitable on the movable mounting. Where the movable mounting is a lobed structure comprising freely rotating wheels mounted in each of the lobes, the borescope mounting may be positioned on a line between two of the wheels, and equidistant between the wheels. The longitudinal axis of the borescope mounting may, where the guide device is mounted parallel to the wall of the furnace, be at an angle of between 20 and 90 degrees, preferably at an angle of between 25 and 75 degrees to the frame. Where the frame is parallel to the wall of the furnace the angles to the wall of the furnace will be the same. The borescope mounting desirably has a diameter large enough to enable insertion of a borescope through the tube. A fixing collar may be present on the borescope mounting to lock the borescope in place.

One or more handles may be mounted on the frame to assist with positioning of the guide device on the furnace wall before and during its use.

The guide device should be suitably sized to hold the thermal imaging camera. The guide device may have a width in the range of about 0.1 to 0.9 metres or 0.3 to 0.9 metres. If mounted on a stand, the stand may have a height in the range of about 1.0-2.5 metres, preferably about 1.5 to 2.0 metres.

In use, the guide device is mounted onto the exterior wall of the furnace over a suitable orifice or opening, such as an inspection port. Where present, the clamp and/or magnets may be used to attach the guide device to the wall. The spacing means, stand, legs and support member, where present, help to hold the apparatus in the desired position. A thermal imaging camera comprising a borescope and a digital camera unit is coupled to the guide device. The borescope is inserted into the interior of the furnace and held in place by the guide device. One or more images are recorded using the thermal imaging camera at a first position. The borescope connected to the thermal imaging camera is then moved in a controlled manner, by means of the guide device, from the first position to a second position, which may be adjacent to or overlap with the first position. During the movement from the first position to the second position, the thermal imaging camera records multiple additional images in the interior of the furnace. The image recorded at the first position may be combined with the multiple images recorded as the borescope is moved to create a composite image of the interior of the furnace, from which temperature data for surfaces of interest may be obtained.

Assuming steady furnace operation, each image shows a part of the same source object. The change in position and orientation of the borescope between successive images can be inferred using any suitable method, allowing for the known distortion introduced by the camera optics and taking advantage of the constraints on movement imposed by the guide. Once the position and orientation of the borescope in each frame is known, the frames may be merged to create a composite image.

The invention will further be described by reference to the following drawings in which.

Figure 1:
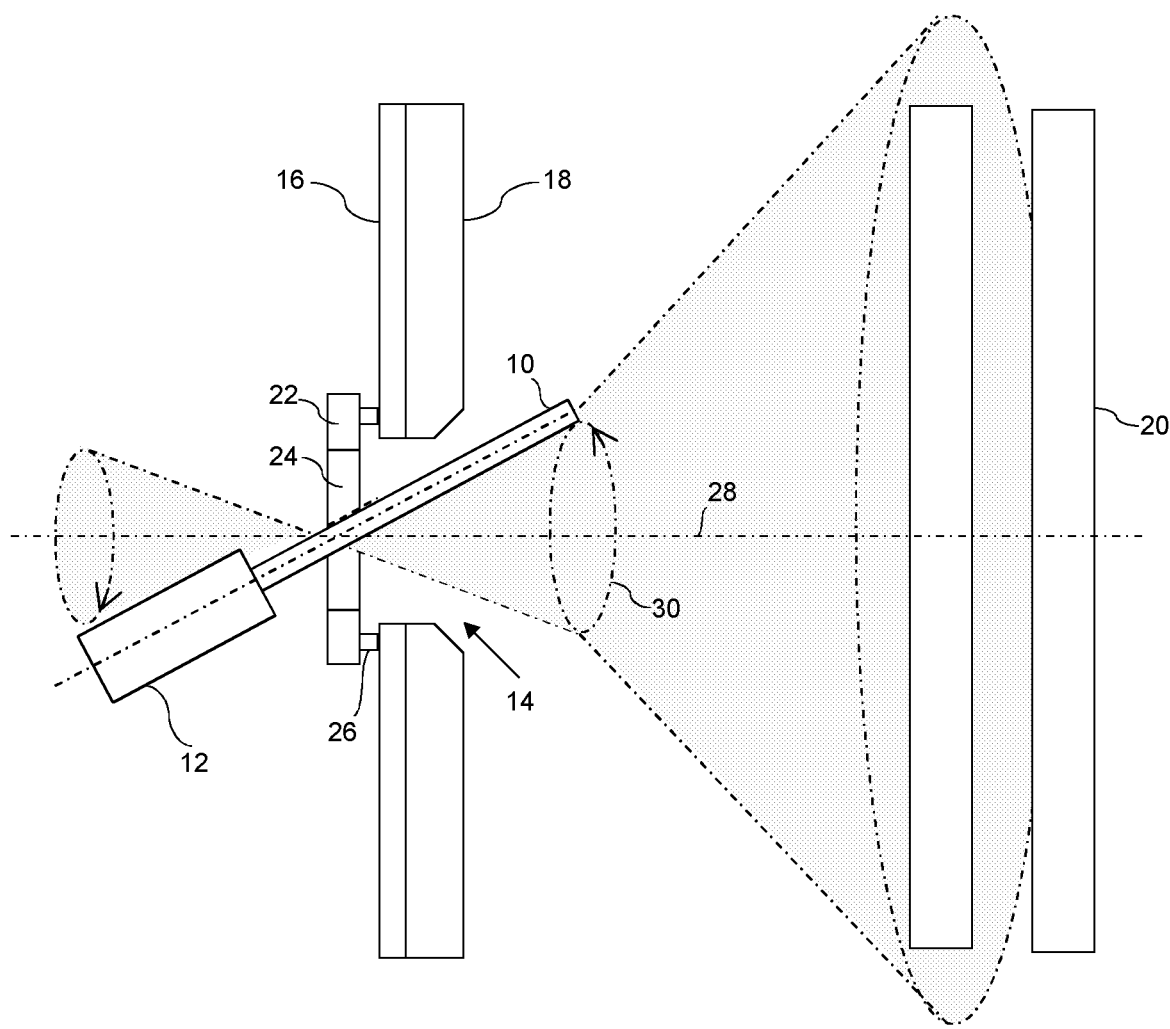
FIG. 1 is a side-view depiction of a guided thermal imaging camera in use in a tubular furnace.

In FIG. 1, a thermal imaging camera, comprising a rigid borescope 10 attached to a digital camera unit 12, is inserted through an inspection port 14 into the interior of a furnace. The inspection port 14 is bounded by the furnace wall 16, which is protected by an internal refractory layer 18. The furnace may be a steam reformer furnace comprising multiple rows of tubes 20 containing steam reforming catalyst. The rows of tubes are heated by a plurality of burners mounted on the interior of the furnace wall (not shown). The thermal imaging camera is mounted in a guide device comprising a frame 22 supporting a movable mounting 24. The frame is mounted on the exterior of the wall 16 by meant of spacing pins 26. The movable mounting 24 is configured to be rotated in the frame 22 about an axis of rotation 28 thereby moving the borescope in a circular path from a first position to a second position adjacent to or overlapping with the first position. The borescope 10 is attached to the movable mounting 24 at an angle of about 45 degrees to the wall 16 of the furnace. The circular movement of the mounting 24 from the first position to the second position therefore causes the borescope 10 to describe a cone 30 as it is moved from the first position to the second position. Arrows are included to depict the rotation of the borescope 10 and camera unit 12. As a result of using the guide device, the field of view 32 of the borescope 10 moves in a controlled manner within the steam reformer furnace, that enhances the capture of thermal image data.

Figure 3:
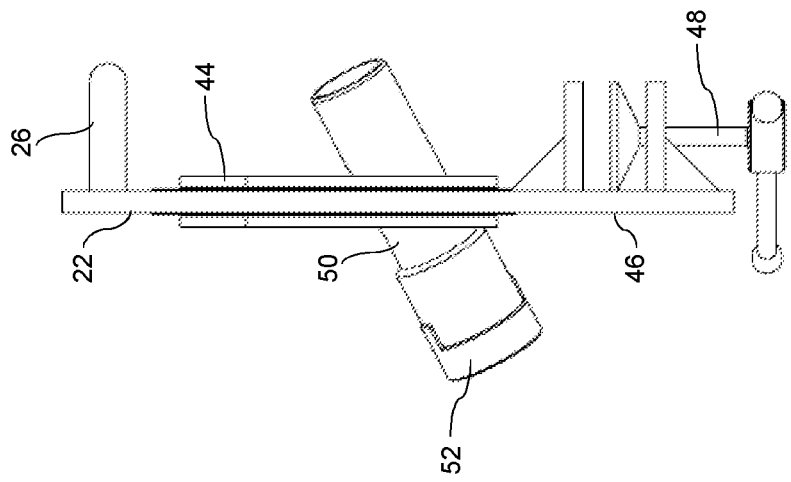
FIG. 3 is a side drawing of the thermal imaging guide device of FIG. 3.
Figure 2:
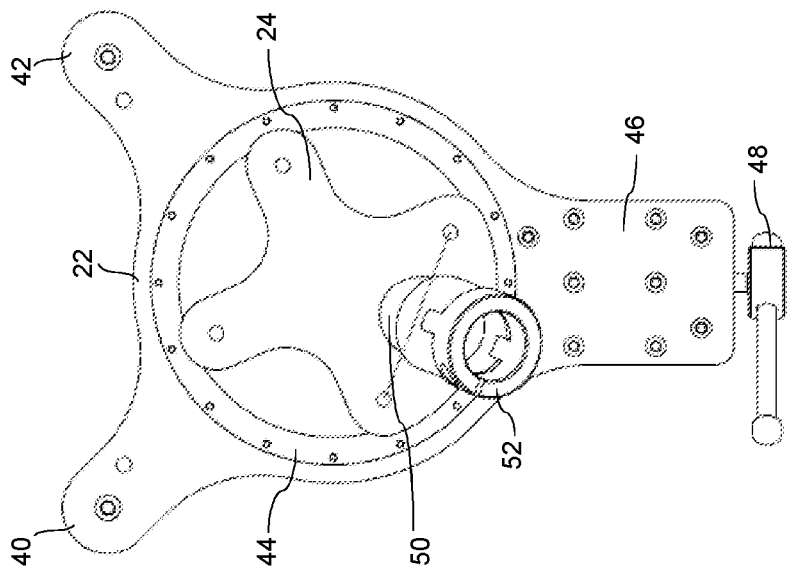
FIG. 2 is a plan drawing of one embodiment of a guide device.
Figure 4:
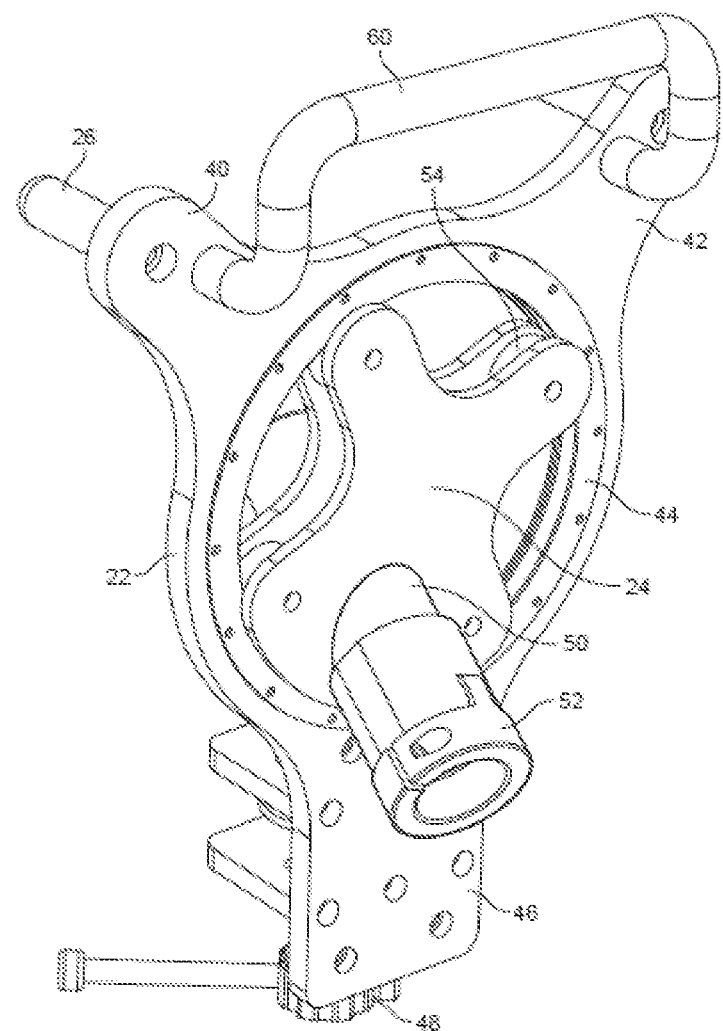
FIG. 4 is an oblique depiction of a further embodiment of a of a guide device.

In FIGS. 2, 3 and 4 a guide device is depicted comprising a frame 22 in the form of a shaped metal plate supporting a movable mounting 24. The frame comprises upper left and right horns 42, 44, each supporting a spacing pin 26 extending from the back of the frame. Beneath the horns, the frame comprises a circular track 44, fixed centrally within the frame, that provides a circular space in which the movable mounting 24 is located. The diameter of the circular track 44 is about 30 cm. Beneath the track 44, the frame further comprises a clamp portion 46 extending vertically downwards that comprises a screw clamping device 48 for clamping the guide device to an exterior wall of a furnace. The movable mounting is a four-lobed structure comprising freely rotating wheels (FIG. 4, 54) mounted in each of the lobes that run on the track 44 and enable the movable mounting to rotate within the frame. The movable mounting further comprises a tubular borescope mounting 50 that passes through the movable mounting. The borescope mounting 50 is positioned on a line between two of the wheels, and equidistant between the wheels. The longitudinal axis of the borescope mounting 50 is at an angle of about 45 degrees to the frame. The borescope mounting 50 has a diameter large enough to enable insertion of a borescope therethrough. A fixing collar 52 is present on the borescope mounting 50 to lock the borescope in place. In FIG. 4, a handle 60 is mounted between the horns 40, 42, to assist with positioning of the guide device on the furnace wall before and during its use.

Figure 5:
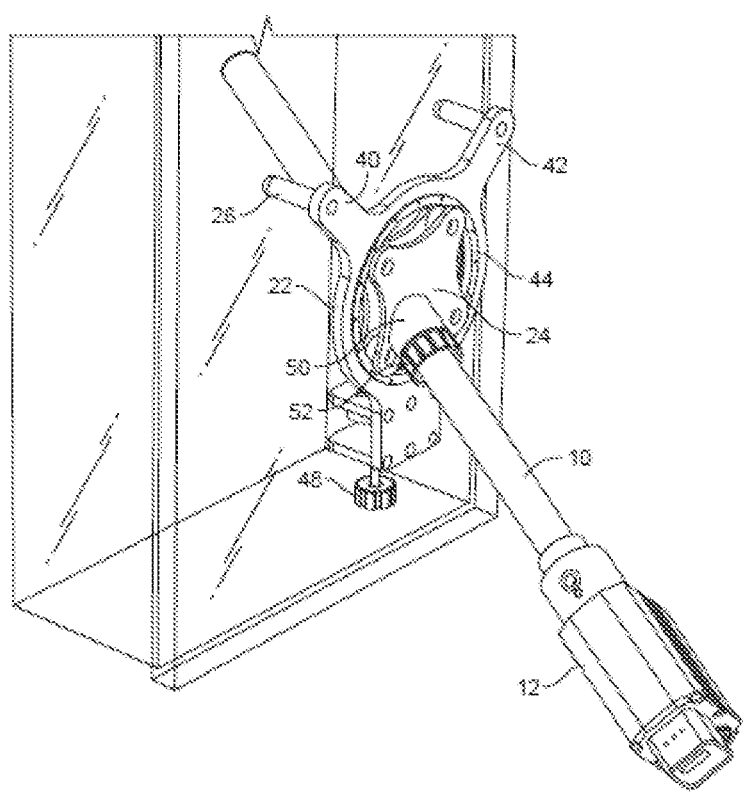
FIG. 5 is an oblique depiction of a further embodiment of a guide device similar to that in FIGS. 2 and 3 with a thermal imaging camera attached.

FIG. 5 depicts apparatus comprising a thermal imaging camera comprising a borescope 10 and a camera unit 12 attached to a guide device similar to that in FIGS. 2 and 3 in which the borescope 10 is inserted through the borescope mounting 50.

Figure 6:
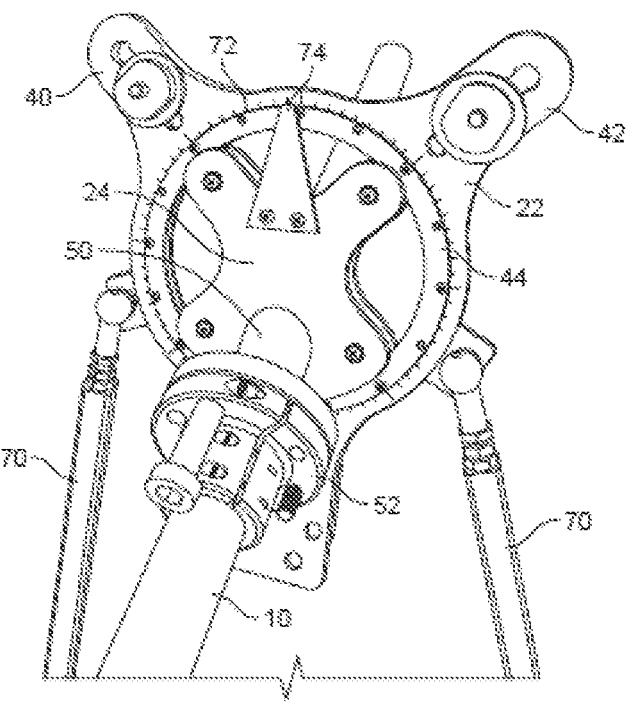
FIG. 6 is a front view of a further embodiment of a guide device with a thermal imaging camera attached.
Figure 7:
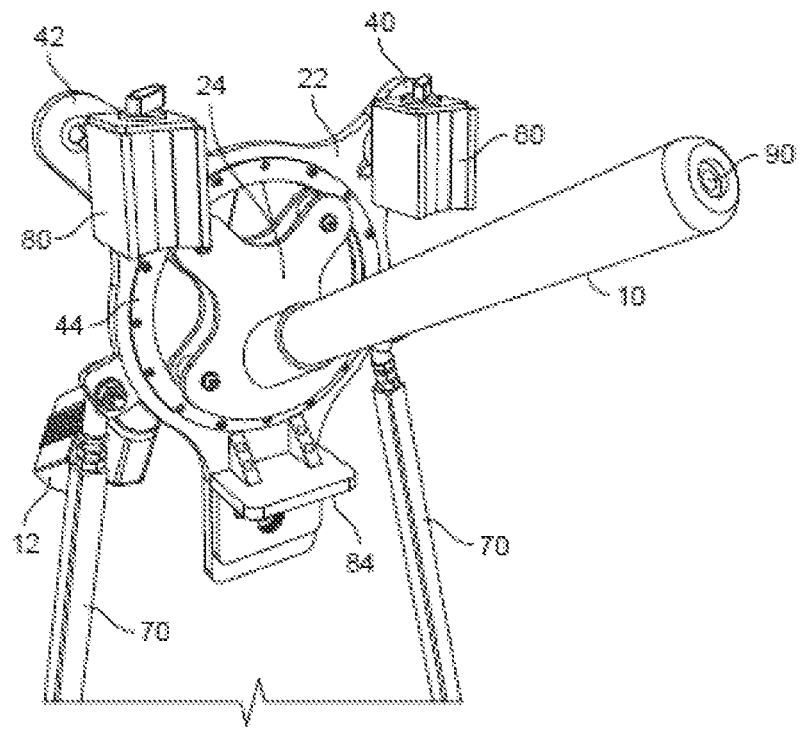
FIG. 7 is a back view of the embodiment of FIG. 6.

In FIGS. 6 and 7 a guide device is depicted comprising a frame 22 in the form of a shaped metal plate supporting a movable mounting 24. The frame has upper left and right horns 42, 44, each supporting magnet blocks (FIG. 7, 80) extending from the back of the frame. Beneath the horns, the frame comprises a circular track 44, fixed centrally within the frame, that provides a circular space in which the movable mounting 24 is located. Beneath the track 44, the frame further comprises a support member (FIG. 7, 84) extending perpendicular to the frame 22 for supporting the apparatus on the edge of an opening in the furnace wall. The movable mounting is a lobed structure comprising freely rotating wheels mounted in each of the lobes that run on the track 44 and enable the movable mounting to rotate within the circular track 44 within the frame 22. The movable mounting further comprises a tubular borescope mounting (FIG. 6, 50) that passes through the movable mounting 24. The borescope mounting 50 is positioned on a line between two of the wheels, and equidistant between the wheels. The longitudinal axis of the borescope mounting 50 is at an angle of about 45 degrees to the frame. The borescope mounting 50 has a diameter large enough to enable insertion of a borescope 10 therethrough. A fixing collar (FIG. 6, 52) is present on the borescope mounting 50 to lock the borescope in place. The entire device is supported on two legs 70 that extend downwardly from the sides of the frame 22. The track 44 further comprises a scale 72 that indicates by means of a pointer 74 attached to the movable guide 24, the degree of rotation of the borescope 10. The viewing end of the borescope comprises a lens 90 through which the images may be captures during use.

In use, the guide device is mounted onto the exterior wall of the furnace over a suitable orifice such as an inspection port. The clamp 48 or magnets 80 are used to attach the guide device to the wall and help to hold it in the desired position. A thermal imaging camera comprising a borescope 10 and a digital camera unit 12 is attached to the guide device by inserting the borescope 10 through the borescope mounting 50 into the interior of the furnace and fixing it in place using the collar 52. One or more images are recorded using the thermal imaging camera at a first position. The movable mounting 24 is then rotated manually within the frame 22 causing the camera 12 and borescope 10 to rotate from the first position to a second position, which may be adjacent to or overlap with the first position. The angle at which the borescope is mounted results in the borescope describing a cone as the mounting 24 is rotated from the first position to the second position. During the rotation, the thermal imaging camera records multiple additional images of the interior of the furnace.

The image recorded at the first position is combined with the multiple images recorded as the borescope and attached camera are rotated to create a composite image of the interior of the furnace, from which temperature data for the tube surfaces may be obtained.

For the embodiments of the guide devices shown in FIGS. 1-7, all the images share a common fixed point, and each image is an approximate rotation of the previous image about this point.

The invention claimed is:

1. A method of recording images within a furnace using a thermal imaging camera comprising a borescope connected to a digital camera unit, the furnace having an interior, the method comprising: (a) inserting the borescope into the interior of the furnace, (b) collecting one of more images of the interior of the furnace using the thermal imaging camera with the borescope at a first position, and (c) moving the borescope from the first position to a second position and collecting one or more images of the interior of the furnace as the borescope is moved from the first position to the second position, wherein borescope movement is guided by means of a guide device comprising a movable borescope mounting, mounted externally on the furnace, wherein the movable borescope mounting provides a circular movement from the first position to the second position, thereby causing the borescope to describe a cone within the furnace as the borescope is moved from the first position to the second position.

2. The method according to claim 1 further comprising a step of (d) combining the images collected in steps (b) and (c) to create a composite image of the interior of the furnace.

3. The method according to claim 1 wherein the movement of the thermal imaging camera from the first position to the second position is manual or driven by a motor.

4. The method according to claim 1 wherein the movable borescope mounting holds the borescope at an angle of between 25 and 75 degrees, to a surface of the furnace on which the guide device is mounted.

5. The method according to claim 1 wherein the borescope is inserted through the movable borescope mounting and into the furnace, the movable borescope mounting holds the borescope at an angle of between 25 and 75 degrees to a surface of the furnace on which the guide device is mounted and provides a circular movement from the first position to the second position, thereby causing the borescope to describe a cone within the furnace as the borescope is moved from the first position to the second position.

6. The method according to claim 1 wherein the furnace is a steam reformer comprising a plurality of tubes containing a steam reforming catalyst.

7. An apparatus for recording images within a furnace, comprising (i) a thermal imaging camera comprising a digital camera unit connected to a borescope and capable of recording a plurality of images, and (ii) a guide device comprising a movable borescope mounting for guiding the borescope, wherein the guide device is configured to be mounted externally on the furnace and to guide movement of the borescope from a first position to a second position within the furnace and wherein the movable borescope mounting provides a circular movement from the first position to the second position, thereby causing the borescope to describe a cone within the furnace as the borescope is moved from the first position to the second position.

8. The apparatus according to claim 7 wherein the thermal imaging camera comprises a camera comprising an optical sensor and a rigid borescope comprising an elongated housing having a viewing end and a sensor end, a multi-element relay lens assembly within the elongated housing having at least two optical pieces for directing a real image viewed by the rigid borescope to the camera, the viewing end comprising a lens, wherein the sensor end of the rigid borescope is operatively connected to the camera.

9. The apparatus according to claim 8 wherein the thermal imaging camera comprises an outer housing containing at least a portion of the rigid borescope extending from the viewing end of the borescope and extending towards the sensor end, the outer housing having an outlet at the viewing end of the rigid borescope and an inlet adjacent the sensor end to permit a cooling gas to be passed through the outer housing.

10. The apparatus according to claim 7 wherein the movable borescope mounting is configured to be rotated.

11. The apparatus according to claim 10 wherein the movable borescope mounting is located within a frame and comprises wheels or bearings that engage with a circular track disposed within the frame.

12. The apparatus according to claim 10 wherein the movable borescope mounting is configured to hold the borescope at an angle of between 25 and 75 degrees to a to a surface of the furnace on which the guide device is to be mounted.

13. The apparatus according to claim 7 wherein the movable borescope mounting has an orifice through which the borescope is inserted, the movable borescope mounting is configured to hold the borescope at an angle of between 25 and 75 degrees to a surface of the furnace on which the guide device is mounted and provide a circular movement from the first position to the second position, thereby causing the borescope to describe a cone within the furnace as the borescope is moved from the first position to the second position.

14. A furnace comprising the apparatus according to claim 7, said furnace having one or more inspection holes or other orifices through which the borescope is inserted.

15. The furnace according to claim 14 wherein the furnace is a steam reformer containing a plurality of catalyst-filled tubes.

16. A device suitable for guiding a borescope of a thermal imaging camera within a furnace, said device comprising a borescope guide device comprising a movable borescope mounting and configured to be mounted on the exterior of the furnace wherein the movable borescope mounting provides a circular movement from a first position to a second position, thereby causing the borescope to describe a cone within the furnace as the borescope is moved from the first position to the second position.

17. The device according to claim 16 wherein the movable borescope mounting is configured to be rotated.

18. The guide device according to claim 17 wherein the movable borescope mounting is located within a frame and comprises wheels or bearings that engage with a circular track disposed within the frame.

19. The device according to claim 16 wherein the movable borescope mounting is configured to hold the borescope at an angle of between 25 and 75 degrees to a surface of the furnace on which the device is to be mounted.

20. The device according to claim 16 wherein the movable borescope mounting has an orifice configured to hold the borescope, the movable mounting is configured to hold the borescope at an angle of between 25 and 75 degrees to a surface of the furnace on which the guide device is to be mounted and provide a circular movement from the first position to the second position, thereby causing the borescope to describe a cone within the furnace as the borescope is moved from the first position to the second position.

\* \* \* \* \*